United States Patent

[11] 3,597,600

[72] Inventors Carl E. Herendeen
Danville;
Robert A. Ragen, Hayward, both of, Calif.
[21] Appl. No. 821,590
[22] Filed May 5, 1969
[45] Patented Aug. 3, 1971
[73] Assignee The Singer Company

[54] ELECTRONIC DESK TOP CALCULATOR HAVING A DUAL FUNCTION KEYBOARD LOGIC MEANS
10 Claims, 10 Drawing Figs.

[52] U.S. Cl. .... 235/156, 340/365
[51] Int. Cl. .... G06f 7/48
[50] Field of Search .... 235/156, 145; 340/365, 324.1, 324 A

[56] References Cited
UNITED STATES PATENTS

| | | | |
|---|---|---|---|
| 2,978,680 | 4/1961 | Schulte, Jr. | 235/165 X |
| 3,200,375 | 8/1965 | Lutz | 340/365 X |
| 3,315,889 | 4/1967 | Thevis | 235/145 |
| 3,405,392 | 10/1968 | Milne et al. | 235/156 X |
| 3,509,329 | 4/1970 | Wang et al. | 235/156 |

*Primary Examiner*—Malcolm A. Morrison
*Assistant Examiner*—David H. Malzahn
*Attorneys*—Patrick J. Schlesinger, Charles R. Lepchinsky and Jay M. Cantor

ABSTRACT: An electronic desk top calculator is disclosed which has a plurality of digit keys for entering numeric data into a storage portion and a plurality of function keys for specifying data handling operations to be performed on entered numeric data. One of the function keys is coupled to a dual function logic circuit which is controlled by a single key. When this single key is actuated after the actuation of one or more digit keys, the circuit acts as an entry circuit and produces a signal which indicates that entry of a number is complete. When this single key is actuated after the actuation of a function key, including itself, the circuit acts as a change sign circuit and produces a signal for incrementing the sign bit of the number in an entry register.

PATENTED AUG 3 1971 3,597,600

SHEET 1 OF 5

Carl E. Herendeen
Robert A. Ragen
*INVENTORS.*

BY [signature]
ATTORNEY

ELECTRONIC DESK TOP CALCULATOR HAVING A DUAL FUNCTION KEYBOARD LOGIC MEANS

BACKGROUND OF THE INVENTION

1. Field of the Invention

This invention relates to electronic desk top calculators, and more particularly to an apparatus for indicating that entry of a number into the calculator has been completed and for changing the algebraic sign of a number in the entry register, both functions being performed in response to the actuation of a single key.

2. Brief Description of the Prior Art

In recent years, relatively small desk top electronic calculators having increasingly been utilized for performing arithmetic operations for accounting, scientific, and like uses. Know electronic calculators are ordinarily provided with storage means having a plurality of registers for storing numeric data which is entered by an operator via a keyboard. With numeric data present in one or more of the registers, various arithmetic operations can be performed on the data—such as add, subtract, multiply, and divide—by the actuation by the operator of one or more function keys corresponding to the operation desired. After the calculator has performed the specified operation, the result is usually displayed to the operator by means of a cathode ray tube, an electromechanical printer, or a similar equivalent display device.

In known devices, the entry of a complete number is ordinarily accomplished by successive actuation of the proper digit keys, beginning with the most significant digit and ending with the least significant digit of the complete number. For example, entry of the complete number 1 2 3, 4 5 6 is accomplished by actuation of the one digit key, then the two digit key, etc., one being the most significant digit and six being the least significant digit. In a typical calculator organization, as each successive key is actuated a representation of the digit corresponding to the actuated key is automatically entered into the storage portion of the calculator, usually into a special location termed the entry register. After the last digit key has been actuated, a function key—usually designated as the entry key—must then be actuated to indicate to the calculator that all of the digits of the complete number have been entered. Actuation of the entry key thus conditions the calculator circuitry for the entry of additional numeric data in such a manner as to prevent commingling of the digits of the data to be entered with those digits already entered. This is normally accomplished internally by shifting the digits of the already entered number from the entry register of the storage portion to a second register. Thus, entry of a complete number is accomplished by successive actuation of the proper digit keys, followed by actuation of the entry key.

It frequently becomes necessary in the operation of an electronic desk top calculator to perform calculations with one or more negative numbers, i.e., numbers whose algebraic sign is negative. Since the digits which are ordinarily entered into the storage portion of the calculator are absolute values carrying no information respecting their algebraic sign, some provision must be made in the calculator to enable relatively unskilled operators to perform rapid calculations involving both positive and negative quantities. In prior art devices, this is ordinarily done by providing a special location in each register of the storage portion into which information specifying the algebraic sign, commonly termed the sign bit, can be placed. In known devices, a separate key, normally termed the change sign key, and associated circuitry, is provided for this purpose. When this key is actuated, a signal is produced which changes the sign bit in such a manner as to indicate a number of the opposite sign. The entry of a negative number is accomplished by successive actuation of the proper digit keys followed by actuation of the change sign key, followed by actuation of the entry key. Entry of the negative number −1 2 3, 4 5 6, for example, would proceed by actuation of the one digit key, then the two digit key, etc., until the six digit key has been actuated, followed by actuation of the change sign key, followed by the actuation of the entry key.

The above arrangement wherein a separate key and associated circuitry are provided to enable an operator to perform calculations with both positive and negative numbers suffers from several disadvantages. One of the highly desirable features possessed by electronic desk top calculators is the speed with which calculations can be performed on numeric data. The provision of a separate change sign key which must be actuated whenever a negative number is to be entered into the calculator and which is physically spaced from the entry key greatly increases the time required for the performance of an individual calculation. Since in ordinary usage several thousand calculations are performed on a calculator in a given day, this arrangement seriously impairs the efficiency of the machine. The provision of a separate change sign key further impairs the efficiency of a calculator due to the fact that the probability of error in performing calculations increases with the number of keys which must be actuated by a human operator to enable the calculations to be performed. In addition, the provision of an additional key and associated circuitry substantially increases the cost of manufacturing a calculator, and increases the likelihood of calculator failure by the provision of additional mechanical and electrical components.

SUMMARY OF THE INVENTION

Briefly described, the present invention is directed to an improved keyboard device for use in electronic desk top calculators and which has a plurality of digit keys, and a plurality of function keys, with one of the function keys coupled to a dual function logic circuit for indicating completion of the entry of a number into the calculator when actuated after the actuation of at least one of the digit keys and for incrementing the value of the sign bit associated with the number when actuated after the actuation of one of the function keys including itself. The invention thus eliminates the need for an additional change sign key and associated circuitry and increases the speed with which repetitive calculations involving both positive and negative numbers can be performed on an electronic desk top calculator. The invention further reduces the probability of error in entering numeric data into the calculator and performing calculations thereon.

For a fuller understanding of the nature and advantages of the invention, reference should be had to the following detailed description, taken in conjunction with the accompanying drawings wherein like reference characters designate like or similar elements throughout the various views and in which:

DESCRIPTION OF THE PREFERRED EMBODIMENT

Figure 1:
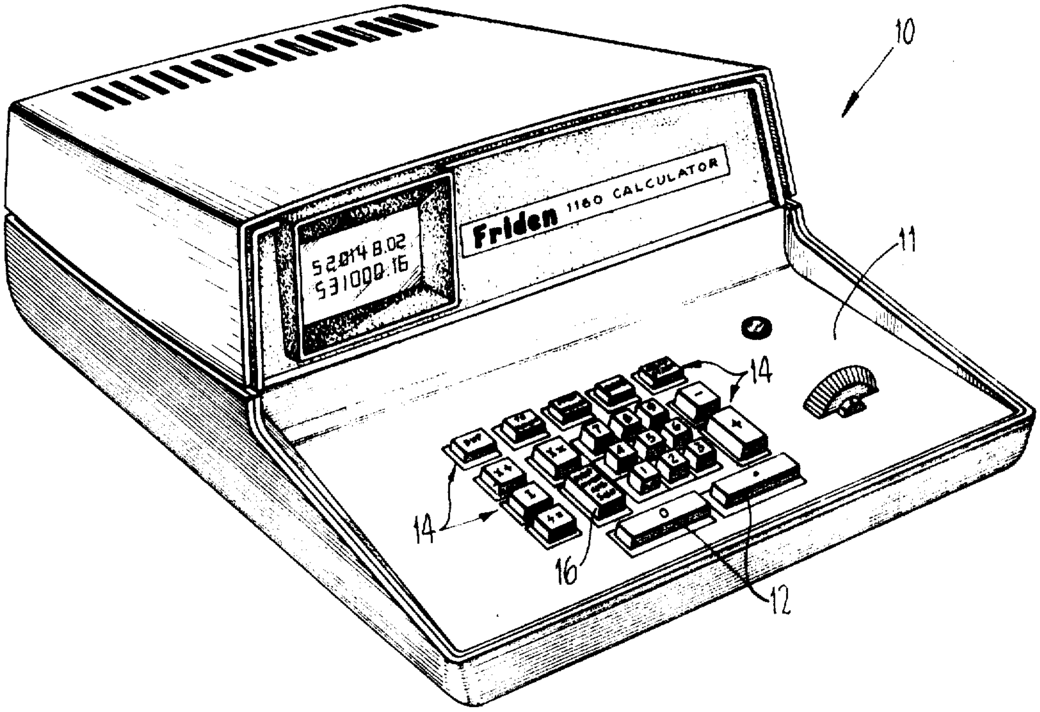
FIG. 1 is a perspective view of an electronic desk top calculator embodying the invention.
Figure 2:
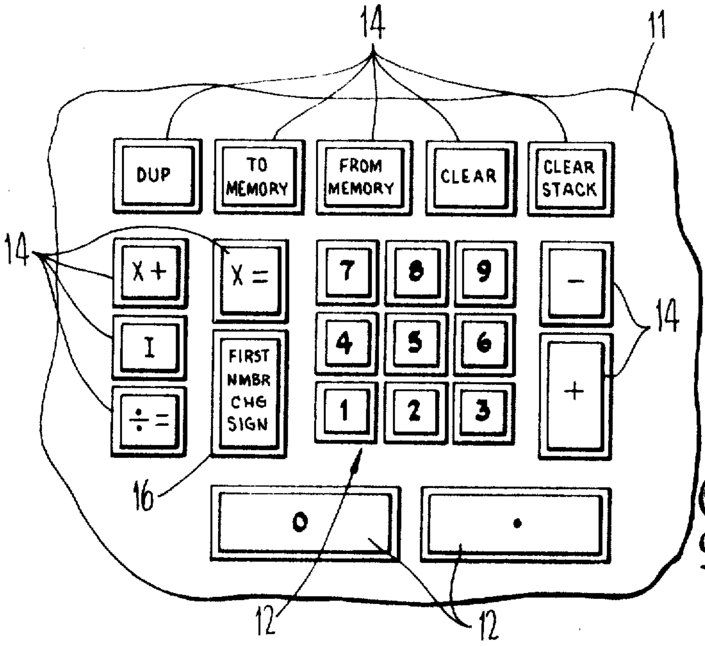
FIG. 2 illustrates the keyboard of a preferred embodiment of the invention.

Referring now to the drawings in detail, FIG. 1 is a perspective view of an electronic desk top calculator 10 embodying the invention, while FIG. 2 shows the keyboard 11 of a preferred embodiment of the invention. The illustrated keyboard has digit keys 12 for entering numeric data into the calculator digit by digit. As more fully discussed below in conjunction with FIG. 9, in the calculator disclosed herein, actuation of the digit key results in entry of that digit into the calculator memory. The illustrated keyboard is also provided with function keys 14 and 16 which, when actuated by an operator, result in the performance of that function on the entered numeric data. FIRST NUMBER CHANGE SIGN function key 16 is a special dual function key which, when actuated after the actuation of one or more of the digit keys 12, generates a function signal indicating completion of the entry of a number and, when actuated after actuation of one or more of the function keys 14 or itself, generates a sign bit incrementing signal for incrementing, or changing, the value of the sign bit in the entry register. The actual operation of this key 16 and its associated circuitry is more fully discussed below.

DATA ORGANIZATION

Figure 3:
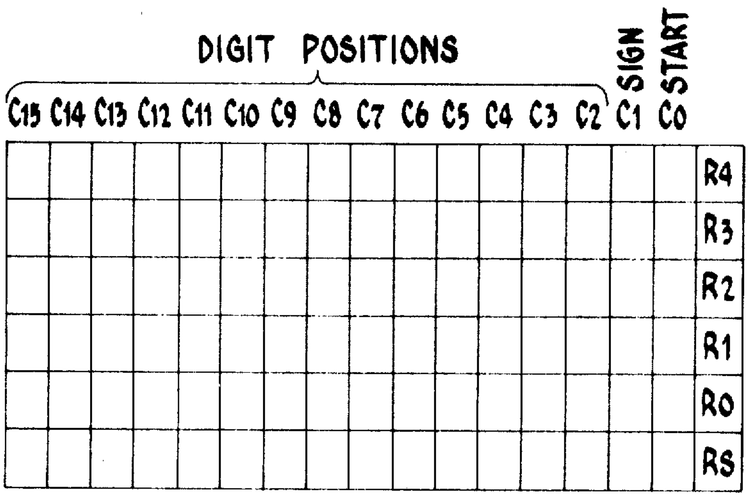
FIG. 3 illustrates the register organization utilized in the calculator of FIG. 1.
Figure 4:
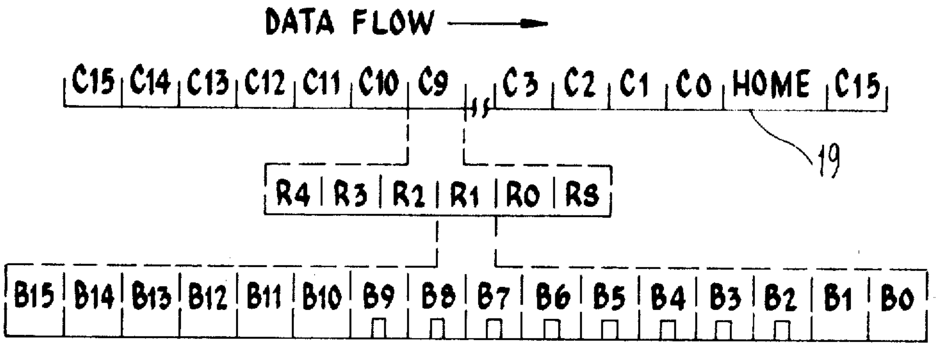
FIG. 4 shows the serial data train utilized in the calculator of FIG. 1.

The organization of data utilized in the preferred embodiment of the invention is illustrated in FIGS. 3 and 4. FIG. 3 shows an organization of a plurality of registers RS, R0, R1, R2, R3, and R4, each having a plurality of digit positions C0 through C15. As will be apparent to those skilled in the art, this organization may be achieved in various ways, such as by a magnetic core memory (with the number of cores at each data location being determined by the code used), one or more tracks on a magnetic drum, or the like. In the preferred embodiment of this invention, the register organization of FIG. 3 is realized by a serial data train which is recirculated through a suitable delay device, such as an acoustic delay line. This serial data train is arranged, as shown in FIG. 4, with the digit positions of the registers interlaced such that like orders C of digit positions of each register occur as a group with the lowest order digit position being first in time and the highest order digit position being last in time, the direction of data flow being to the right as indicated by the arrow. For example, column time C9 includes the like order data positions of each register RS, R0, R1, R2, R3, and R4, with the lowermost register RS digit position occurring first and the uppermost register R4 digit position occurring last. Each complete occurrence of the data train C0 through C15 is followed by a HOME period 19 during which time no signals or data occur and after which the entire data train is repeated.

In the above organization, the first column C0 contains a start pulse or signal which indicates the end of the HOME period and the beginning of a new serial data train, C0—C15. The contents of column C1 digit position are the individual sign bits corresponding to each numeral, if any, in associated registers RS, R0, R1, R2, R3, and R4. In the preferred embodiment, a one-bit in the C1 digit position specifies a negative number, while a zero-bit in this position specifies a positive number. The digit positions of each of the remaining columns C2—C15 contain the digits of the number, if any, in each associated register.

In the preferred embodiment, each digit position utilizes a pulse count notation such as is illustrated in FIG. 4 for the ninth order C9 of the register R1. Each digit position contains 16 B0—B15 time spaces, only nine of which, B2—B10, are used to provide pulse notations for each of the digits, zero through nine. For example, a one is denoted by a pulse in the time period B2, a two denoted by a pulse in each time period B2 and B3, a three is denoted by a pulse in each time period B2, B3, and B4, etc., with a zero being indicated by an absence of a pulse in the time periods B2—B10. Thus, FIG. 4 illustrates an eight in the C9 digit position of the register R1.

Figure 5A:
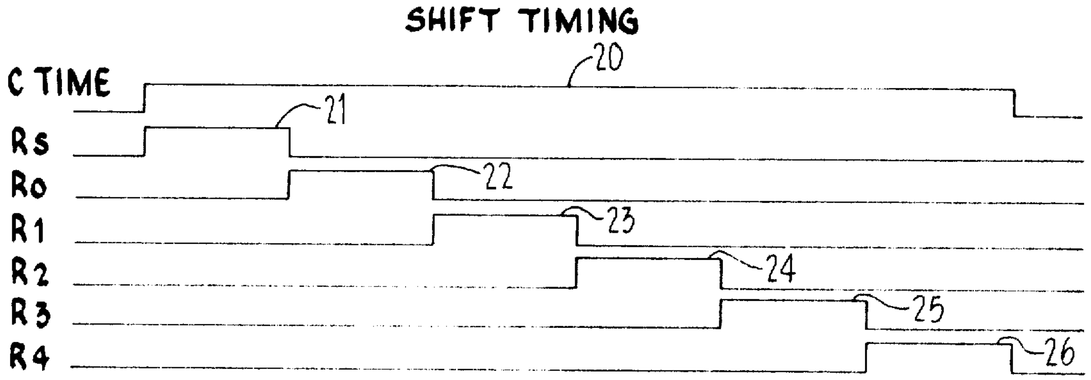
FIGS. 5A and 5B show appropriate timing signals used to control the operation of the calculator.
Figure 5B:
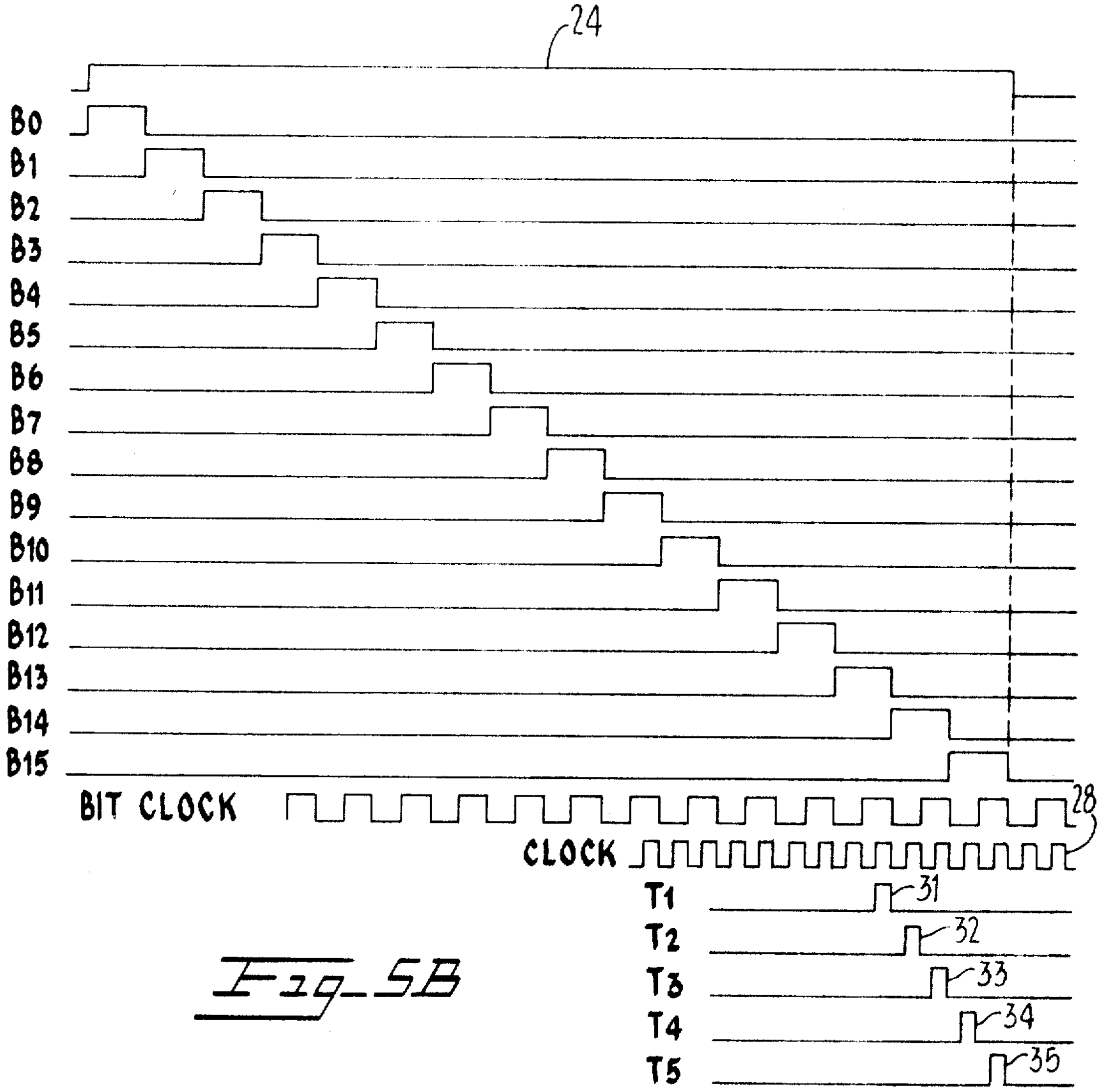

The register organization illustrated in FIG. 3 is accessed in an interlaced, serial manner as shown in FIG. 4 by means of recurring control and timing signals such as illustrated by FIGS. 5A and 5B. Referring now to FIG. 5A, there is illustrated a single column C signal 20. For purposes of simplicity and clarity, only one column signal is illustrated. As will be apparent to those skilled in the art, however, the column signal will occur sequentially, there being one such signal for each of the columns C0—C15. For each column signal, there are six independently occurring register signals 21—26, one for each of the six registers RS, R0, R1, R2, R3, and R4, respectively, with the register RS control signal 21 occurring first in time and the register R4 control signal 26 occurring last in time as shown in FIG. 5A. As will now be apparent, the simultaneous occurrence of a column C signal and one register signal determines the occurrence, or accessibility, of a particular digit position C0—C15 of a particular register with like order register digit positions occurring consecutively for each column.

As discussed above, each register digit position includes sixteen B0—B15 time spaces. Access to such time spaces is accomplished by 16 independent and consecutively occurring signals as illustrated in FIG. 5B for the register R2 control signal 24 of FIG. 5A. FIGS. 5A and 5B thus illustrate control signals that may correspond to each of the 16 time spaces B0—B15 of each register digit position and each digit position C0—C15 of each register.

The signals illustrated in FIGS. 5A and 5B can be generated by any number of well-known means, such as by applying the output 28 of a square wave oscillator, or clock, to a series of counters, the outputs of selected stages of which are gated. In the preferred embodiment of the invention, the clock signal generator is activated by the start of the serial data train, C0—C15 (shown in FIG. 4) and inactivated during the time interval between successive data trains, that is, during the occurrence of the HOME period 19. Also, for reasons that will be apparent from the description below, subsequent to the time period for each time space during which the serial pulse count notation may occur (B2—B11), but before the end of the digit position time period, a series of five independent, consecutively occurring T signals are generated. These signals, T1—T5, denoted by the reference numbers 31—35, respectively, are used to initiate various arithmetic nd control operations, such as setting various counters to zero, transferring digit information from one counter to another, and the like.

It is to be understood that the timing and control signals shown in FIGS. 4, 5A, and 5B merely illustrate one way of accessing a register organization as shown in FIG. 3 and that various other signal arrangements may be devised to accomplish this same purpose.

Figure 6:
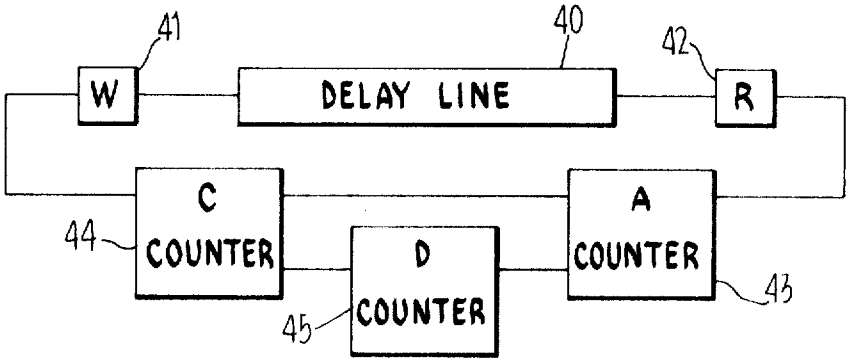
FIG. 6 illustrates in block diagram form the general organization of the calculator.

FIG. 6 illustrates in block diagram form the general organization of the calculator embodying the invention. A serial memory device 40, such as an acoustic delay line, has write 41 and read 42 transducers associated with opposite ends thereof. Associated with the delay line are three registers, or counters, 43—45, for providing two external data recirculation paths for a data train, such as illustrated in FIG. 4. Each counter is adapted to store a single digit (zero through nine). The A counter 43 receives the serial data emanating from the delay line 40 and is adapted to be counted either up or down. Digit data in the A counter 43 can be transferred in parallel to the C counter 44 which is adapted to be counted down in order to serially place the data therein onto the delay line 40. The data recirculating through the delay line 40, A counter 43, and C counter 44, can be further delayed for reasons discussed below, by being transferred in parallel from the A counter 43 to the D counter 45, and therefrom in parallel to the C counter 44.

The operation of the apparatus of FIG. 6 is such that each digit emerging from the delay line is counted into the A counter 43 so that each pulse of the digit causes the A counter 43 to advance one count. The digit is then shifted, in parallel, into the C counter 44 by the occurrence of a T1 signal 31 (see FIG. 5B) and the C counter 44 is then counted down to a zero configuration. Each down count of the C counter 44 results in a pulse being launched on the delay line. After the digit is shifted from the A counter 43 to the C counter 44, the A counter 43 is caused to be zero set by the occurrence of a T4 signal 34 (see FIG. 5B) so that the next digit to emerge from the delay line may be counted into it. Addition of two digits is accomplished by control logic (not shown) that inhibits the zero setting of the A counter 43. Accordingly, a second digit emerging from the delay line is added to a first digit already contained in the counter. For subtraction, the control logic inhibits the zero set signal and as the pulses of the second digit emerge from the delay line, the control logic will cause the A counter 43 to be counted down instead of up as is done in addition. Multiplication and division can be accomplished by successive addition and subtraction, respectively.

DATA HANDLING

In addition to the above-described arithmetic operations, the calculator generally illustrated in FIG. 6 is organized to perform several basic data handling operations. Where appropriate, in the following discussion, references to the A counter 43, D counter 45, and C counter 44 have been abbreviated to A, B, and C, respectively, to avoid unnecessary prolixity. The first of these data handling operations, already discussed above, is termed IDLE and consists of the normal progression of data from the delay line to A counter, from A counter to C counter, then from C counter back to the delay line. The remainder of these data handling operations are shifting operations wherein the contents of the various digit positions are shifted from one location to another in the serial data train. These operations are now described with reference to FIGS. 6 and 7.

The first shifting operation, SHIFT UP, consists of inserting the D counter into the normal progression of data so that the numeric data progresses from line A, A—D, D—C, and C line. This can be done in any suitable way known to those skilled in the art. In the preferred embodiment, the normal A—C shift is inhibited and the D—C shift enabled during the occurrence of the T1 timing signal 31 (FIG. 5B). After the D—C shift, D is cleared by the occurrence of a T2 signal 32. An A—D shift is then enabled by T3 signal 33 after which A is cleared by T4 signal 34. Since the insertion of an additional counter in the path of the data introduces a delay of one digit position time, this results in all numeric data being placed in the next succeeding digit position.

Figure 7:
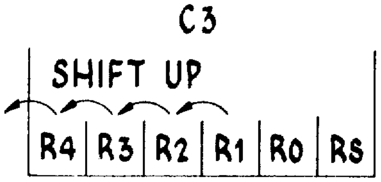
FIGS. 7 and 8 illustrate the data handling operations utilized in the calculator.

For example as discussed below in conjunction with the entry of numeric data, before the entry of a first digit of a new number from the keyboard, it is desirable to clear the entry register R1. This is accomplished by a SHIFT UP of the contents of registers R1—R4. As illustrated in FIG. 7 for column 3, the contents of C3R1 are placed in C3R2, those of C3R2 in C3R3, those of C3R3 in C3R4, and the contents of C3R4 are deliberately destroyed by reverting to the normal A—C progression after the C3R4 data is placed in the D counter and clearing the D counter. The D counter is again inserted in the data path to place C4R1 to C4R4 data in the A—D—C path, which similarly results in C4R1—C4R3 data each being placed in the next succeeding digit position and C4R4 data being lost. This data handling sequence is continued until the C15 data has been so shifted. As can be seen from the data organization shown in FIG. 3, the effect of this handling sequence after one complete data pass is to shift the numeric data in register R1 up to register R2, that in R2 up to R3, and that in R3 up to R4, while the numeric data in R4 is lost. It is notable that when shifting up, the sign bits in column C1 are also shifted along with the numeric data in column C2—C15 in order to preserve the correspondence between each sign bit and its associated number.

Another shifting operation which is used in handling the numeric data is SHIFT LEFT which consists of inserting the D counter into the normal progression of data for one digit position time every *n*th digit position time, where *n* equals the number of registers, so that the data progresses line-A, A—D, D—C, and C line for each *n*th shift. Between each *N*th shift, the data is caused to follow the normal A—C progression while the data in D is preserved. Since the numeric data preserved in D is delayed by *n* digit position times, after one complete data pass, the numeric data in the desired register will have been shifted one order of magnitude to the left.

Figure 8:
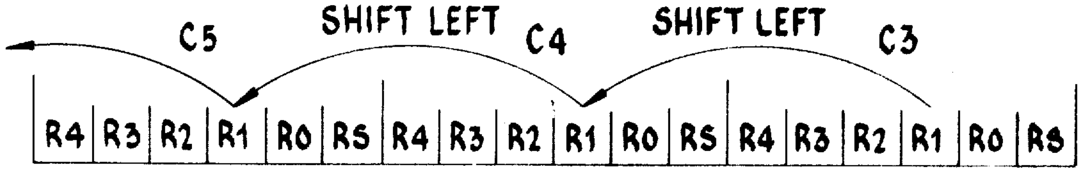

For example as discussed below in conjunction with the entry of a digit from the keyboard, it is desirable to shift the numeric data in the entry register R1 one column to the left since every digit enters the memory via digit position C3R1. This is accomplished by placing the contents of C3R1 in the A counter and inserting the D counter into the data path prior to the next shift. During this next shift, the contents of D are placed in C and the contents of A are placed in D. After this shift, the normal A—C progression is reverted to. During the next five shifts, the contents of D are preserved therein. Prior to the sixth shift ($n$=6), the D counter is again inserted into the data path. After this sixth shift, the contents of D are located in C, while D now contains the former contents of C4R1. Once again, the normal A—C progression is reverted to. This data handling sequence is continued until all the numeric data has been so shifted. As can be seen from FIG. 8 and the data organization shown in FIG. 3, the effect of this data handling sequence is to shift the numeric data in register R1 one column to the left. It is notable that, when shifting left, the data in columns C0 and C1 are not disturbed in order to preserve the SYNC and SIGN information in C0 and C1, respectively.

Figure 9:
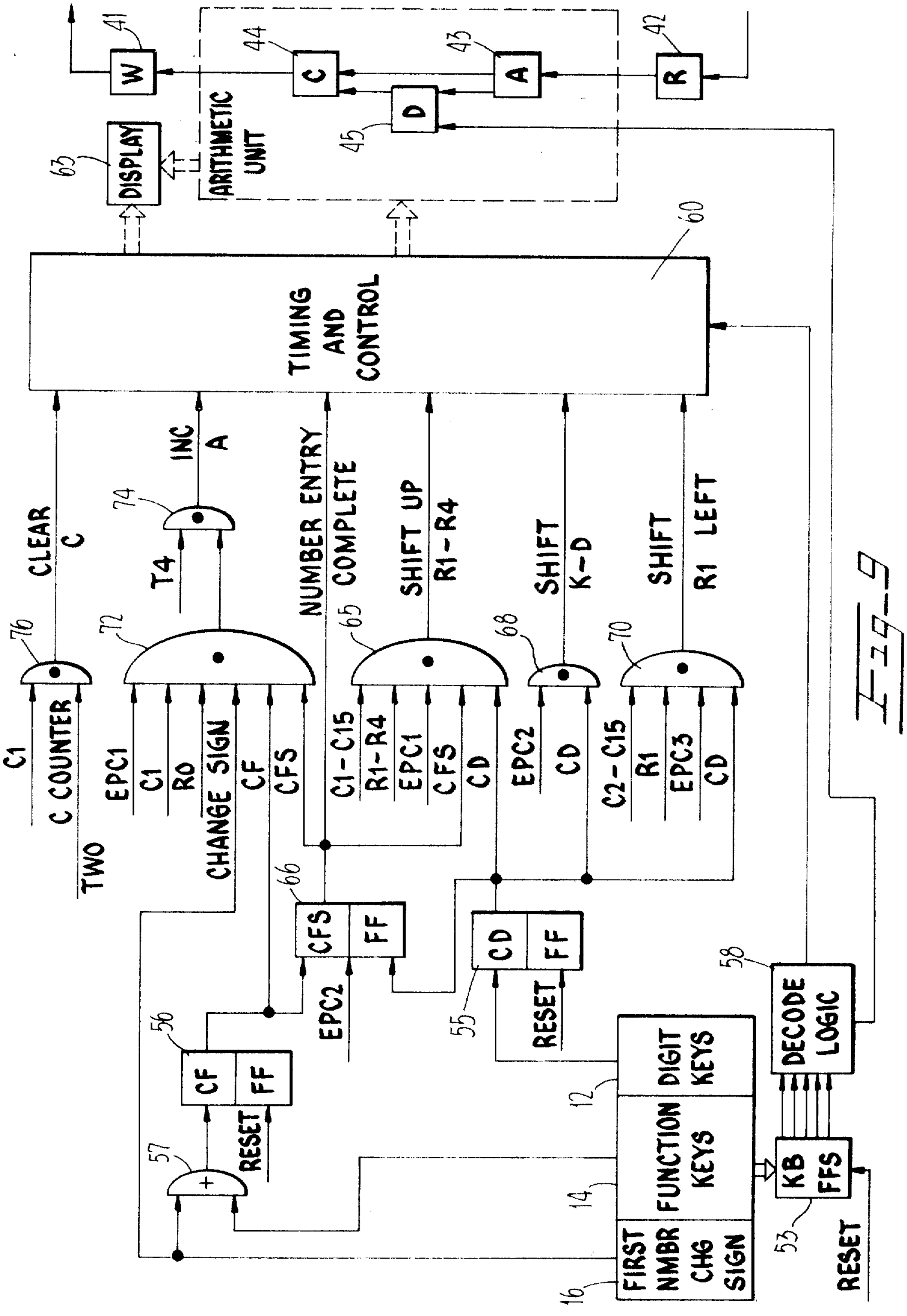
FIG. 9 is a block diagram showing the operation of a preferred embodiment of the invention.

FIG. 9 is a block diagram illustrating the preferred embodiment of the invention. Digit keys 12, function keys 14, and FIRST NUMBER CHANGE SIGN function key 16 are coupled to switches, such as reed switches or the like (not shown), which are coupled in turn to keyboard flip-flops 53. Digit keys 12 are also coupled to common digit flip-flop 55, while function keys 14 and FIRST NUMBER CHANGE SIGN function key 16 are coupled to common function flip-flop 56 through OR gate 57. To avoid unnecessary prolixity, keyboard flip-flops 53, common digit flip-flop 55, and common function flip-flop 56 will hereinafter be referred to as KBFFS, CDFF, and CFFF, respectively. KBFFS 53 are coupled through decode logic 58 to timing and control unit 60 and D counter 45. As is obvious to those skilled in the art, timing and control unit 60 may comprise various counters and logic gates required to control the above-described shifting operations and arithmetic functions to be performed on the data in the calculator memory. In the ensuing description, only those portions of timing and control unit 60 necessary to an understanding of the invention are set forth with particularity. Thus, the arithmetic unit and the display device 63, which may be a printer or a cathode ray tube, are depicted in general form only. Control of these elements and interaction therebetween is schematically portrayed by means of phantom arrows.

The set output of CDFF 55 is coupled to the reset input of common function storage flip-flop 66, hereinafter designated CFSFF. The set output of CDFF 55 is also coupled to the input of AND gate 65. A second input to AND gate 65 is the set output of CFSFF 66. The remaining inputs to this AND date are timing signals C1—C15, R1—R4, discussed above in conjunction with FIGS. 5A and 5B, and EPC1. EPC1 signal denotes that the entry phase counter, discussed below, is set to a count of one. With the simultaneous occurrence of all of the above signals, AND gate 65 produces an output signal which directs timing and control unit 60 to shift UP the contents of registers R1—R4 with the exception of the SYNC signal in column C0. The set output of CDFF 55 is also coupled to one input of AND gate 68, the other input to which is EPC2 which denotes a count of two in the entry phase counter. The output of AND gate 68 directs timing and control unit 60 to shift the setting in the KBFFS 53 to the D counter 45. The set output of CDFF 55 is also coupled to AND gate 70 along with timing signals C2—C15, R1, and EPC3, the latter denoting a count of three in the entry phase counter. The output of AND gate 70 directs timing and control unit to shift each digit in register R1 one column to the left with the exception of this sign bit.

The set output of CFFF 56 is coupled to the set input of CFSFF 66 and to the input of AND gate 72. A second input to AND gate 72 is the set output of CFSFF 66, while a third input is the signal designated CHANGE SIGN which is obtained whenever FIRST NUMBER CHANGE SIGN function key 16 is actuated. This signal may be obtained in any suitable way known to those skilled in the art, e.g., by coupling key 16 to the input of a monostable multivibrator and sampling the output. Alternatively, this signal may be obtained from KBFFS 53. The remaining input signals to AND gate 72 are C1, R0, and EPC1, the latter designating a count of one in the entry phase counter. The output of AND gate 72 is coupled to AND gate 74 along with T4 signal. With both signals present at the input of AND gate 74, an output signal is produced which directs timing and control unit 60 to increment A counter 43 by a magnitude of one. The inputs to AND gate 76 are C1 timing signal, and C COUNTER TWO, the latter designating the fact that C counter 44 is set to a count of two. This latter signal may be obtained in any suitable way known to those skilled in the art, e.g., by causing a flip-flop to be set whenever C counter 44 holds a count of two and by periodically resetting said flip-flop at appropriate intervals. The output of AND gate 76 directs timing and control unit 60 to clear the C counter which causes it to be reset to zero.

The entry phase counter may be any suitable counter capable of counting from zero to three. In the preferred embodiment, it is coupled to CDFF 55 and CFFF 56 in such a manner that it is clamped to zero (disabled) unless either CDFF 55 or CFFF 56 is set. The entry phase counter may be counted up by any suitable timing signal, such as the end of C15R4 or the beginning of the serial data train. Thus, for successive passes of the data train, the entry phase counter starting from a count of zero will be counted one, two, three, and then zero. In the preferred embodiment, the transition from EpC3 to EPC0 is used to reset KBFFS 53, CDFF 55, and CFFF 56, as depicted by the arrowed lead lines labeled RESET.

In the preferred embodiment, CFSFF 66 comprises a known type of bistable device having a set input, a reset input, and a toggle input, and which changes state upon the simultaneous occurrence of a toggle input signal and a set or reset input signal. The toggle signal employed is EPC2, which is present whenever the entry phase counter holds a count of two.

The operation of the device proceeds as follows. Actuation of one of the digit keys 12 representing the first digit of a number sets the appropriate KBFFS 53 and CDFF 55 and allows the entry phase counter to step to one. The set output of CDFF 55, while present at the reset input of CFSFF 66 will not cause this flip-flop to transition at this time due to the absence of EPC2 signal. As is evident from the description below, CFSFF 66 will always be in a set condition at the beginning of numeric data entry and thus the set output of this element will be present at the input of AND gate 65 along with the set output of CDFF 55. With the simultaneous occurrence of all the above-noted signals at the input of AND gate 65, an output signal is produced which directs timing and control unit to SHIFT UP the contents of registers R1—R4. Thus, the contents of register R1 are shifted up to register R2; those of R2 up to R3; those of R3 up to R4; and those of R4 are lost. As noted above, the SYNC signal in column C0 is unaffected.

When the entry phase counter steps to two, the simultaneous occurrence of EPC2 and CD signals at the reset input of CFSFF 66 causes this flip-flop to be reset. EPC2 and CD at the input of AND gate 68 causes a SHIFT K—D signal to appear at the output thereof, which results in the setting in KBFFS 53 (corresponding to the selected digit) being placed in the D counter 45 via decode logic 58. With the digit now in D, the calculator is ready for the entry of the digit into the serial data train.

When AND gates 70 is enabled by EPC3 and the remaining timing signals, a SHIFT R1 LEFT signal is produced which directs timing and control unit 60 to shift R1 left beginning with the data in C2R1. When this occurs, the digit in D counter 45 enters the calculator memory in the C2R1 compartment in the manner discussed above in conjunction with FIG. 8. At the end of this data pass, the entry phase counter resets to zero which causes KBFFS 53, CDFF 55, and CFFF 56 to be reset. Since both CDFF 55 and CFFF 56 are reset the entry phase counter is clamped to zero and the calculator is placed in IDLE mode.

If the next key actuated is also one of the digit keys, 12, KBFFS 53 and CDFF 55 will be set as before, but CFSFF 66 will be in reset condition and there will be no CFSFF 66 set output signal present at the input of AND gate 65. Since this signal is absent, AND gate 65 will not produce a SHIFT UP R1—R4 signal during EPC1. Thus, once the first digit of a number has been entered into the caluclator, no SHIFT UP of the data in registers R1—R4 will occur. The remaining steps in the entry operation are exactly as described above and cause the setting in the KBFFS 53 to be placed in D counter 45 and then into the serial data train at C2R1 time while the first entered digit, formerly in C2R1, is shifted left to C3R1 digit position. The end of the cycle finds the calculator once again in IDLE mode.

The above-described digit entry operation may be repeated for as many digits as constitute the number to be entered, up to the maximum capacity of the entry register which is fourteen digits in the disclosed embodiment. Attempted entry of one digit more than the maximum capacity results in the activation of an overflow circuit (not shown) which then provides a suitable indication to the operator that an overflow condition is present.

When the last digit of the complete number has been entered in the above-described fashion, termination of numeric data entry proceeds as follows. Actuation of FIRST NUMBER CHANGE SIGN function key 16, which in this case is being used as an entry key, produces a signal which is applied through OR gate 57 to the set input of CFFF 56. Setting of CFFF 56 enables the entry phase counter to step off zero. No logic action occurs during EPC1. When the entry phase counter steps to two, CFSFF 66 is toggled by EPC2 signal and is caused to change from its reset condition to a set condition due to the presence of CFFF 56 set output signal. Setting of the CFSFF 66 produces a set output signal termed NUMBER ENTRY COMPLETE which is coupled to timing and control unit 60 and serves to indicate the fact that number entry is now completed. NUMBER ENTRY COMPLETE signal may be used as the control signal to cause the entered number to appear on the display device 63. For example, if display device 63 is a cathode-ray tube, appearance of this signal may be used to cause the entered number to be displayed on the face of the CRT. This provides a useful check enabling the operator to immediately determine at a glance whether or not the number was correctly entered before continuing with the calculating process. No logic occurs during EPC2 or EPC3. When the entry phase counter resets to zero, KBFFS 53 and CFFF 56 are reset in the manner discussed above, and the absence of a set output signal from either CDFF 55 or CFFF 56 causes the entry phase counter to be clamped to zero and places the calculator in IDLE mode.

At this point, three modes of calculator operation are possible: firstly, the operator may initiate the entry of a second number by depressing the digit key 12 corresponding to the most significant digit of the number to be entered; secondly, the operator may cause a function to be performed on the already entered data by actuating one of the function keys 14; or thirdly, the operator may specify the number in the entry register to be a negative number by actuating FIRST NUMBER CHANGE SIGN function key 16 a second time. The first mode of operation proceeds exactly as discussed above in conjunction with number entry. In the second mode of operation, actuation of one of the function keys 14 causes a coded representation of that function to be set into KBFFS 53 which is coupled to timing and control unit 60 by means of decode logic 58. Timing and control unit 60 then causes the specified function to be performed by circuitry not shown.

The third mode of operation, that of changing the sign of the number in the entry register, proceeds as follows. The signal produced by the second actuation of FIRST NUMBER CHANGE SIGN function key 16 is coupled to the set input of CFFF 56 through OR gate 57. Setting of CFFF 56 enables the entry phase counter to step off zero and being to count. Since CFSFF 56 is in a set condition, resulting from the above-described termination of data entry operation, a CFSFF 66 set output signal will be present at the input of AND gate 72 along with CFFF 56 set output signal and CHANGE SIGN signal. When the entry phase counter steps to a count of one, EPC1 signal will be present at the input of this AND gate and when the remaining timing signals simultaneously occur, an output signal will be produced which is presented to the input of AND gate 74. When T4 signal is produced at C1R0T4 time, the output of AND gate 74 produces a signal which directs timing and control unit 60 to increment the A counter 43. As a result, a one is set into the A counter just prior to the time (C1R1) when the sign bit for the entry register is counted therein. If the sign bit in C1R1 was zero, denoting a positive number in R1 register, it now becomes a one which denotes a negative number. This sign bit may be then used in circuitry (not shown) to control certain operations of the calculator (such as causing a subtract operation to be performed when the addition key is subsequently actuated). The sign bit may also be utilized to cause the display to produce a subtract (−) symbol, thereby indicating to the operator that the number in the entry register R1 has been specified to be a negative number.

If, prior to the second actuation of key 16, the sign bit in C1R1 is a one, the above-described change sign operation will cause A counter to be set to a count of two. When the C1R1 contents of A counter 43 are shifted to C counter 44, the simultaneous occurrence of C1 and C COUNTER TWO signals at the input of AND gate 76 will produce an output signal which directs timing and control unit 60 to clear the C counter. As a result of this action, C counter will be reset to zero and the sign bit in C1R1 will be a zero designating a positive number in entry register R1. Thus, if dual function key 16, when acting as a change sign key, is actuated with a negative number in register R1, this sign bit will be changed to indicate a number of positive algebraic sign. It is evident that several successive actuations of key 16 will cause the sign bit in C1R1 to change from positive to negative, then to positive, then to negative, etc.

Termination of numeric data entry may also be achieved in the FIG. 9 embodiment by actuating one of the function keys 14. The signal produced by actuation of such a key after digit entry is applied to the set input of CFFF 56 through OR gate 57, and causes this flip-flop to transition to the set condition. Setting of CFFF 56 causes a set output signal to appear which is applied to the set input of CFSFF 66. When the entry phase counter steps to a count of two, the simultaneous occurrence EPC2 and CFFF 56 set output signal causes CFSFF 66 to set, which results in the appearance of NUMBER ENTRY COMPLETE signal. As noted above, actuation of a function key 14 causes a coded representation of that function to be set into KBFFS 53 which is coupled to timing and control unit 60 through decode logic 58 and causes the specified function to be performed by appropriate circuitry. After the function has been performed, the result will be located in entry register R1. If it is desired to change the algebraic sign of this result, the operator need only actuate FIRST NUMBER CHANGE SIGN function key 16 which causes the change sign logic to change the algebraic sign of the number in register R1 in the manner described above.

The above-described embodiment of the invention provides a highly flexible arrangement for entering numeric data into an electronic desk top calculator, for terminating the data entry, and for changing the algebraic sign of the number in the entry register. To enter numeric data, for example, the operator serially actuates the proper digit keys in descending order of magnitude until the last digit has been specified, and then actuates either the FIRST NUMBER CHANGE SIGN function key 16 or one of the function keys 14. To enter a negative number, the operator actuates the proper digit keys and then actuates the FIRST NUMBER CHANGE SIGN function key 16 twice, the first actuation serving to terminate numeric data entry and the second actuation serving to change the algebraic sign of the entered number (initially positive) to indicate a negative number. The elimination of the separate change sign key found in prior art calculators greatly increases the speed with which negative numbers may be manipulated and reduces significantly the probability of error in the entry of numeric data into the calculator. Further, to change the sign of a number already located in the entry register R1 (for example, as the result of a previously performed arithmetic operation), the operator merely actuates the FIRST NUMBER CHANGE SIGN function key 16 once.

It is understood that this invention is not limited to specific details of construction and arrangement thereof herein illustrated and that changes and modifications may occur to one skilled in the art without departing from the spirit of the invention.

What we claim is:

1. In an electronic desk top calculator having a keyboard means for generating numeric data including a sign bit specifying the algebraic sign of said data and function signals denoting operations to be performed on said numeric data, storage means for storing said numeric data, and processing means coupled to said keyboard means and said storage means for performing data handling operations on said data, said processing means including entry means for placing keyboard generated numeric data into said storage means and arithmetic and control means for performing operations on said numeric data in accordance with said function signals, the improvement wherein said keyboard means includes manually actuatable dual function logic means having a single key for generating an entry complete function signal indicating completion of the entry of a number when actuated after entry of at least one digit into said storage means and for generating an increment sign bit function signal for incrementing the value of said sign bit when actuated after the generation of any of said function signals.

2. The apparatus of claim 1 wherein said dual function logic means includes a first bistable device coupled to said single key for producing a first output signal in response to the actuation of said single key, a second bistable device for producing a second output signal in response to the generation of any of said function signals and an AND gate coupled to said single key, said first bistable device, and said second bistable device for producing said sign bit incrementing signal in response to the actuation of said single key and the concurrence of said output signals.

3. The apparatus of claim 1 wherein said keyboard means includes a plurality of digit keys for specifying individual digits of said numeric data and said entry means comprises means for placing the corresponding representation of a specified digit into said storage means before the next succeeding digit is specified by said keyboard means.

4. The apparatus of claim 1 wherein said storage means comprises a memory device arranged in a plurality of registers including an entry register with each said register having a corresponding algebraic sign bit location.

5. The apparatus of claim 4 wherein said memory device comprises an acoustic delay line.

6. The apparatus of claim 4 wherein said entry means includes means for serially accessing said memory device to enter said numeric data in interlaced fashion.

7. The apparatus of claim 4 wherein said dual function logic means includes means for incrementing only the said sign bit in said entry register when actuated after a function signal has been generated.

8. A keyboard device for use in an electronic desk top calculator comprising a plurality of digit keys, a plurality of function keys, and a manually actuatable dual function logic circuit coupled to said keys, said circuit including a single key, means responsive to the actuation of said single key after the action of at least one of said digit keys for generating an entry complete signal for indicating completion of the entry of a number into said calculator, and means responsive to the actuation of said single key after the actuation of any one of said function keys for generating an increment sign bit signal for incrementing the value of the sign bit associated with said number.

9. The apparatus of claim 8 wherein said single key is adapted to generate a first output signal and wherein said dual function logic circuit further includes a first bistable device coupled to said single key for producing a second output signal in response to the actuation of said single key, a second bistable device for producing a third output signal in response to the actuation of one of said function keys, and an AND gate coupled to said single key, said first bistable device, and said second bistable device for producing a sign bit incrementing signal in response to the concurrence of said output signals.

10. The apparatus of claim 9 wherein said dual function logic circuit further includes a third bistable device coupled to said digit keys for producing a fourth output signal in response to the actuation of one of said digit keys, the output of said third bistable device being coupled to said second bistable device to prevent the occurrence of said third output signal after said fourth output signal occurs.